US008459231B2

(12) United States Patent
Borchsenius et al.

(10) Patent No.: US 8,459,231 B2
(45) Date of Patent: Jun. 11, 2013

(54) METHOD FOR REGULATING AN INJECTION SYSTEM OF AN INTERNAL COMBUSTION ENGINE

(75) Inventors: Fredrik Borchsenius, Donaustauf (DE); Uwe Jung, Wörth a. d. Donau (DE); Hui Li, Regensburg (DE); Michael Wirkowski, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 575 days.

(21) Appl. No.: 12/532,255

(22) PCT Filed: Feb. 13, 2008

(86) PCT No.: PCT/EP2008/051716

§ 371 (c)(1),
(2), (4) Date: Jan. 29, 2010

(87) PCT Pub. No.: WO2008/113646

PCT Pub. Date: Sep. 25, 2008

(65) Prior Publication Data

US 2010/0139620 A1 Jun. 10, 2010

(30) Foreign Application Priority Data

Mar. 22, 2007 (DE) ........................ 10 2007 013 772

(51) Int. Cl.

| | |
|---|---|
| ***F02M 63/00*** | (2006.01) |
| ***F02M 69/54*** | (2006.01) |
| ***B60T 7/12*** | (2006.01) |
| ***G05D 1/00*** | (2006.01) |
| ***G06F 7/00*** | (2006.01) |
| ***G06F 17/00*** | (2006.01) |

(52) U.S. Cl.
USPC ............................ 123/447; 123/457; 701/104

(58) Field of Classification Search
USPC ................. 123/456, 447, 457, 458, 460, 463, 123/464, 480, 693–696; 701/102, 104
See application file for complete search history.

(56) References Cited

U.S. PATENT DOCUMENTS

| | | | | |
|---|---|---|---|---|
| 4,858,068 | A | 8/1989 | Bitller et al. | ............. 361/679.01 |
| 6,142,120 | A | 11/2000 | Biester et al. | |
| 6,446,610 | B1 | 9/2002 | Mazet | |
| 6,578,553 | B1 * | 6/2003 | Schubert et al. | .............. 123/458 |
| 6,868,826 | B1 * | 3/2005 | Oono | ......................... 123/339.1 |

(Continued)

FOREIGN PATENT DOCUMENTS

| | | | |
|---|---|---|---|
| DE | 19548278 | A1 | 6/1997 |
| DE | 19731994 | A1 | 1/1999 |

(Continued)

OTHER PUBLICATIONS

International Search Report, PCT/EP2008/051716, 20 pages, Jun. 11, 2008.

(Continued)

*Primary Examiner* — Stephen K Cronin
*Assistant Examiner* — Sherman Manley
(74) *Attorney, Agent, or Firm* — King & Spalding L.L.P.

(57) ABSTRACT

In a method for pressure control in an injection system of an internal combustion engine, a pump efficiency dependent upon the type of pump is taken into account in the control of a high-pressure stored value. To this end, the pump efficiency may be determined based on a stored table or a proximity function.

18 Claims, 2 Drawing Sheets

U.S. PATENT DOCUMENTS

| | | | | |
|---|---|---|---|---|
| 7,216,628 | B2 * | 5/2007 | Hayakawa .................... | 123/458 |
| 2006/0096579 | A1 | 5/2006 | Hayakawa | |
| 2008/0210200 | A1 | 9/2008 | Eser et al. | |
| 2010/0139620 | A1 | 6/2010 | Borchsenius et al. ........ | 123/447 |

FOREIGN PATENT DOCUMENTS

| | | | |
|---|---|---|---|
| DE | 10016900 | A1 | 11/2001 |
| DE | 10112702 | A1 | 10/2002 |
| DE | 60000509 | T2 | 5/2003 |
| DE | 10162989 | C1 | 10/2003 |
| DE | 102005052989 | A1 | 5/2006 |
| DE | 102005026441 | A1 | 12/2006 |
| EP | 2131639 | A2 | 12/2009 |
| FR | 2596231 | A1 | 9/1987 |
| GB | 2180896 | A | 4/1987 |
| WO | WO2006/117287 | A1 | 11/2006 |
| WO | 2008/113646 | A1 | 9/2008 |

OTHER PUBLICATIONS

German Office Action, German application No. 10 2007 013 772.0-26, 5 pages, Aug. 9, 2007.

* cited by examiner

METHOD FOR REGULATING AN INJECTION SYSTEM OF AN INTERNAL COMBUSTION ENGINE

CROSS-REFERENCE TO RELATED APPLICATIONS

This application is a U.S. National Stage Application of International Application No. PCT/EP2008/051716 filed Feb. 13, 2008, which designates the United States of America, and claims priority to German Application No. 10 2007 013 772.0 filed Mar. 22, 2007, the contents of which are hereby incorporated by reference in their entirety.

TECHNICAL FIELD

The invention relates to a method for regulating an injection system of an internal combustion engine.

BACKGROUND

Fuel injection apparatuses for operating an internal combustion engine have been generally known for many years. With a so-called common rail injection system the fuel is fed into the respective combustion chamber of the internal combustion engine by injectors, in particular by piezo injectors. In this process the quality of combustion is dependent on the pressure of a high-pressure accumulator connected upstream of the injectors. To achieve the highest possible specific performance of the internal combustion engine with low pollutant emissions, the pressure of this high-pressure accumulator must be regulated. It is thus possible to achieve injection pressures of 1600 to 1800 bar for the fuel using a high-pressure pump and a pressure accumulator.

Pressure regulation of the high-pressure accumulator can be achieved in different ways. Depending on the embodiment of the injection system it can be done with a pressure regulation valve in the high-pressure region and a volume regulation valve on the low-pressure side of the high-pressure pump or just by means of a volume regulation valve on the low-pressure side of the high-pressure pump. Only the second instance, in other words pressure regulation based on a volume regulation valve, is examined below. The high-pressure accumulator pressure is regulated here by regulating the volume flow in the low-pressure region of the high-pressure pump. This volume flow regulation is dependent both on the system requirement, which is determined by the quantity of fuel injected into the combustion chamber, and the quantity of fuel exiting from the injectors due to switching leakage losses.

During volume flow regulation it must be taken into account that after a regulation intervention the high-pressure pump must be filled with fuel before fuel can once again be pumped into the high-pressure accumulator, thus bringing about a pressure rise in the high-pressure accumulator. The time period required to fill the high-pressure pump up with fuel restricts regulation speed for stability reasons.

SUMMARY

According to various embodiments, the time period required to fill the high-pressure pump up with fuel can be taken into account, in order thus to improve the quality of regulation of the injection system.

According to an embodiment, a method for regulating an injection system of an internal combustion engine, wherein a pressure value in a high-pressure accumulator fed by a pump is regulated, may comprise the step of: generating a controlled variable for regulating the high-pressure accumulator value using an output variable of a regulation unit and a pump efficiency value, which is dependent on a pump type, with an input value that is dependent on a rotation speed of the internal combustion engine, a high-pressure accumulator value, the temporal derivation of the high-pressure accumulator value and the volume flow temperature being formed to determine the pump efficiency value.

According to a further embodiment, the input value can be generated as a summand of output variables of precontrol elements, into which the pressure value in the high-pressure accumulator and the rotation speed of the internal combustion engine or the volume flow temperature or the temporal derivation of the pressure value in the high-pressure accumulator are input respectively as input variables. According to a further embodiment, the output variables of the precontrol elements can be a volume flow respectively. According to a further embodiment, switching leakage losses within the injection system that change over time can be taken into account with the volume flow temperature as an input variable in the precontrol unit. According to a further embodiment, pump efficiency can be determined from a stored table. According to a further embodiment, pump efficiency can be determined by means of an approximation function.

BRIEF DESCRIPTION OF THE DRAWINGS

Details of the invention are described in more detail with reference to the drawings, in which.

DETAILED DESCRIPTION

The advantages achieved by the various embodiments in particular consist in that the quality of regulation of the injection system can be improved by taking into account pump efficiency in a precontroller, thereby achieving improved emission behavior on the part of the internal combustion engine. Pump efficiency here correlates with the time period required to fill the pump up with fuel. Pump efficiency increases, the more quickly the pump is filled with fuel. In this process the fuel supplied to the pump is controlled by way of a volume flow regulation valve upstream of the pump. Taking the pump efficiency into account also allows the quality of regulation of the injection system to be improved in transient operating states of the internal combustion engine. This is advantageous in so far as the pressure value in the high-pressure accumulator has an influence on the response behavior of the engine and drive dynamics.

Figure 1:
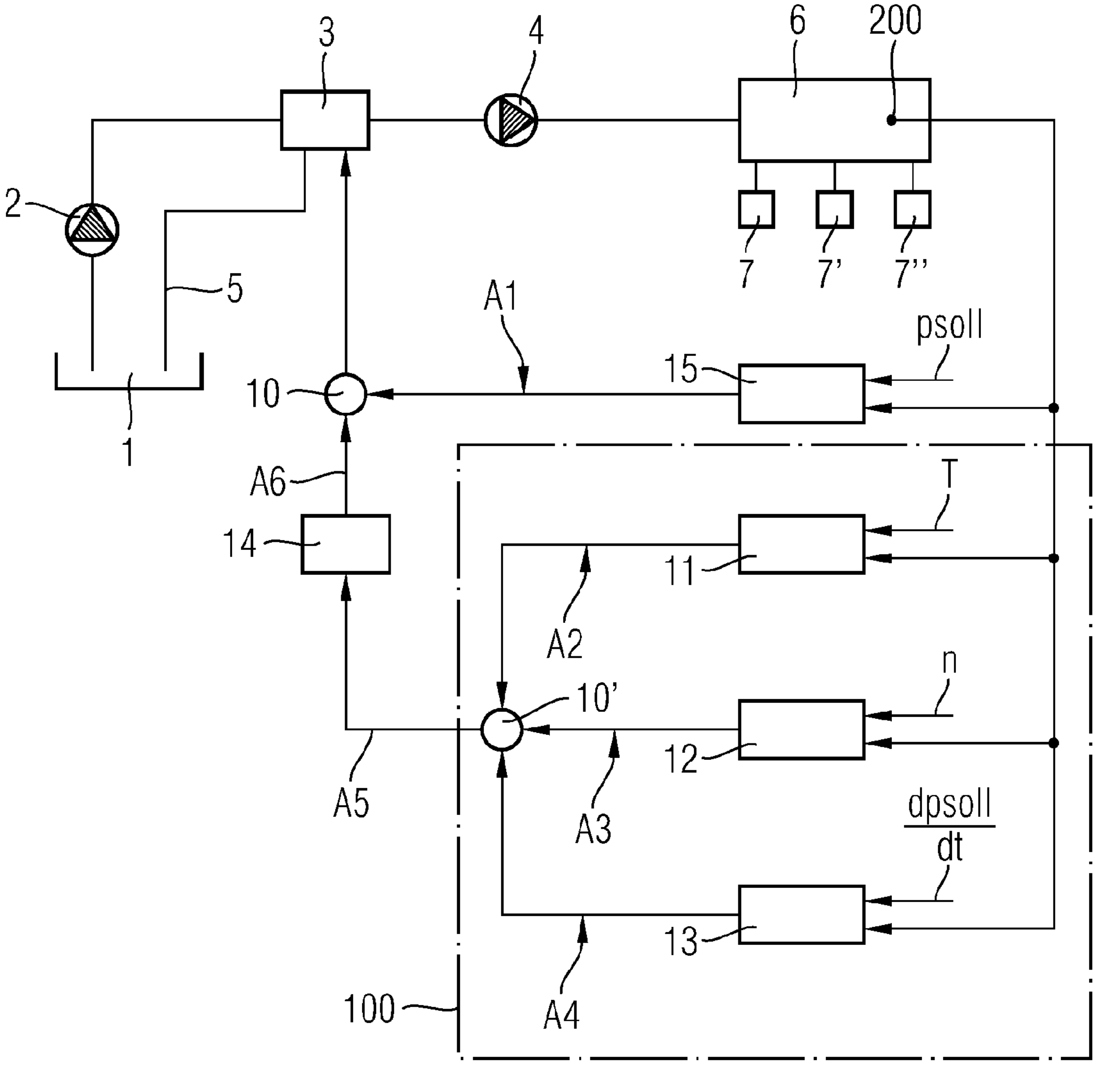
FIG. 1: shows a block diagram of an injection system taking into account pump efficiency.

FIG. 1 shows a block diagram of an injection system taking into account pump efficiency. The injection system here consists of a fuel tank 1, a low-pressure pump 2, which conveys fuel from the tank, a volume flow regulation valve 3 with a return line 5 to the fuel tank 1, a high-pressure pump 4, which supplies fuel to a high-pressure accumulator 6, and injectors 7, 7' and 7" to inject the fuel into a combustion chamber of the internal combustion engine, which is not shown in the drawing.

The low-pressure pump 2 is used to convey fuel from the fuel tank 1 and supply it to a high-pressure pump 4. The high-pressure pump 4 then feeds a high-pressure accumulator 6 with fuel supplied from the low-pressure pump 2. Pressures up to 1800 bar can build up in the high-pressure accumulator 6 in this process. The fuel from the high-pressure accumulator 6 can be injected into a combustion chamber by way of injectors 7, 7' and 7''. In order to be able to regulate the pressure within the high-pressure accumulator 6, a volume flow regulation valve 3 with a return line 5 to the fuel tank is arranged between the low-pressure pump 2 and the high-pressure pump 4. The volume flow regulation valve 3 is used to regulate the intake volume of the high-pressure pump 4 and thus to determine the pressure in the high-pressure accumulator 6.

A measuring facility 200 is also used to measure the pressure in the high-pressure accumulator 6 continuously. This measured pressure serves as an input variable into a regulation unit 15 and for a precontroller 100. A further input variable of the regulation unit 15 is a predeterminable setpoint pressure value pset. The output signal A1 of the regulation unit, realized for example by a PID controller, is supplied to a computation unit 10.

The precontroller is made up of a number of precontrol units 11, 12, 13 and is intended to improve the quality of regulation of the injection system. The measured pressure in the high-pressure accumulator 6 is input here as an input variable into the precontrol units 11, 12, 13, which are connected parallel to one another. The first precontrol unit 11 takes into account the temperature-dependent leakage losses in the injection system. The fuel temperature T in the high-pressure accumulator is therefore also supplied as an input variable to the first precontrol unit 11. Additional account is also taken here of the leakage losses, which change over the course of time due to ageing effects. The output variable A2 of the first precontrol unit 11 is one of a number of input variables for an adding unit 10'.

The second precontrol unit 12 takes into account the quantity of fuel injected into the internal combustion engine by way of the injectors 7, 7', 7''. In addition to the measured pressure in the high-pressure accumulator 6 the rotation speed n serves as a further input variable for the precontrol unit 12, the output variable A3 of which is also supplied to the adding unit 10'.

Finally the third precontrol unit 13 takes into account the pressure changes resulting in the high-pressure accumulator 6. This third precontrol unit 13 is used in particular to take into account the pressure rise or pressure drop in the high-pressure accumulator 6. The output signal 4 of the third precontrol unit 13 is also sent to the adding unit 10'.

In all the precontrol units the output signals A2, A3, A4 are determined based on stored tables or based on approximation functions. The output signals A2, A3, A4 of the precontrol units 11, 12, 13 are then added in the adding unit 10'. It has proven particularly advantageous here for the output signals A2, A3, A4 to be present as volume flow. Pump efficiency is determined in the unit 14 based on the output signal A5 of the adding unit 10' and/or the input value into the unit 14. Pump efficiency can be determined here based on a stored table or an approximation function. The output signal A6 is added to the output signal of the regulation unit 15 in the adding unit 10, the summand serving the computation unit 10 as a controlled variable of the volume flow regulation valve 3.

Figure 2:
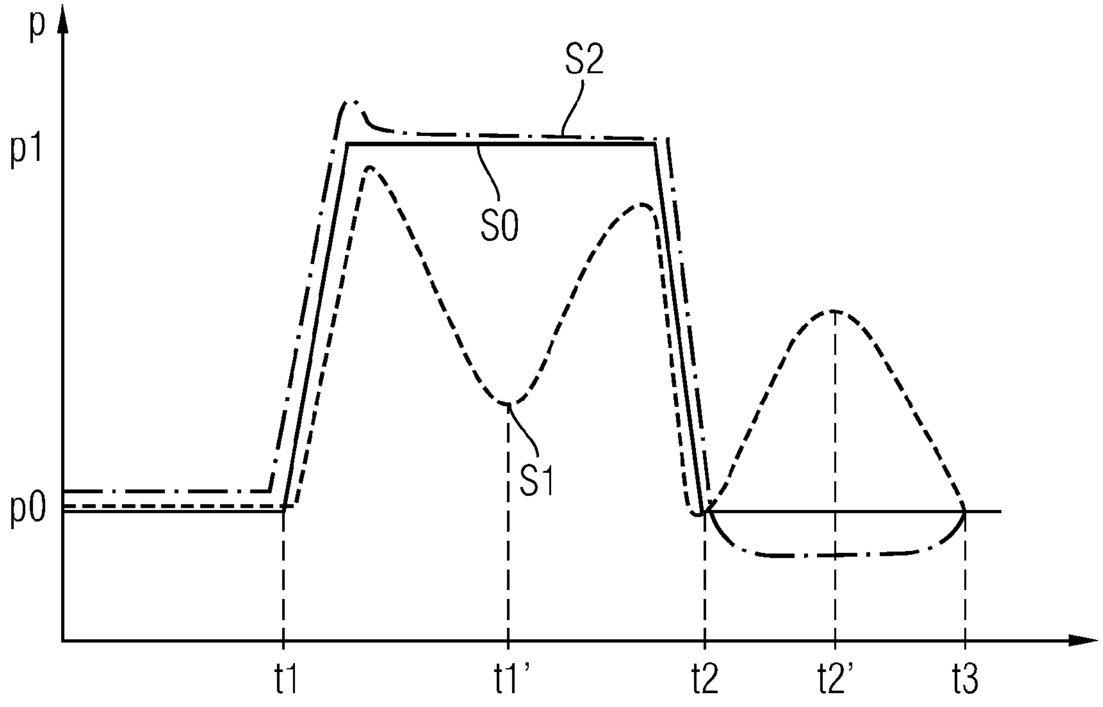
FIG. 2: shows a pressure pattern in the high-pressure accumulator with and without account of pump efficiency during regulation.

FIG. 2 shows a pressure pattern in the high-pressure accumulator with and without account of pump efficiency during regulation. The temporal pressure pattern in the high-pressure accumulator is plotted here. The signal S0 represents the setpoint pressure pattern in the high-pressure accumulator. In contrast the signal S1 represents the actual pressure pattern in the high-pressure accumulator without taking into account pump efficiency during regulation and S2 represents the signal taking into account pump efficiency during regulation.

S0 here shows that there is to be a pressure rise in the high-pressure accumulator from the pressure value p0 to the pressure value p1 from time t1. From time t2 the pressure is to drop back from the pressure value p1 to the pressure value p0. The actual pressure pattern S1 also rises from time t1 but cannot keep the pressure value p1 constant over a predetermined time period and drops. The undershooting of the pressure pattern at S1 is due here to the high leakage losses and low pump efficiency. Low pump efficiency therefore results from insufficient fuel being supplied to the high-pressure pump due to the opening position of the volume flow regulation valve. The pump can therefore not achieve the pressure value required in the high-pressure accumulator. Therefore in the next regulation step the opening position of the volume flow regulation valve must also be increased. From time t1' the volume flow regulation valve is opened in such a manner that a pressure rise takes place in the high-pressure accumulator.

An overshooting of the actual pressure pattern S1 is established between times t2 and t3. This is due to high pump efficiency and low leakage losses. High pump efficiency is also established due to the opening position of the volume flow regulation valve. Too high a fuel volume flow is supplied to the pump. In the next regulation step therefore the opening position of the volume flow regulation valve must be reduced. From time t2 the opening position of the volume flow regulation valve is selected in such a manner that the high-pressure accumulator pressure drops.

What is claimed is:

1. A method for regulating an injection system of an internal combustion engine, wherein a pressure value in a high-pressure accumulator fed by a pump is regulated, the method comprising the step of:

generating a controlled variable for regulating the pressure value in the high-pressure accumulator using an output variable of a regulation unit and a pump efficiency value, which is dependent on a pump type, wherein the pump efficiency value is derived based on an input value that is dependent on a rotation speed of the internal combustion engine, the pressure value in the high-pressure accumulator, the temporal derivation of the high-pressure accumulator value and the volume flow temperature wherein the controlled variable is provided to control a volume flow regulation valve inline with a high pressure pump.

2. The method according to claim 1, wherein the input value is generated as a sum of output variables of precontrol elements, into which the pressure value in the high-pressure accumulator and the rotation speed of the internal combustion engine or the volume flow temperature or the temporal derivation of the pressure value in the high-pressure accumulator are input respectively as input variables.

3. The method according to claim 1, wherein the output variables of the precontrol elements are a volume flow respectively.

4. The method according to claim 1, wherein switching leakage losses within the injection system that change over time are taken into account with the volume flow temperature as an input variable in the precontrol unit.

5. The method according to claim 1, wherein pump efficiency is determined from a stored table.

6. The method according to claim 1, wherein pump efficiency is determined by means of an approximation function.

7. A method for regulating an injection system of an internal combustion engine, comprising the steps of:

generating a controlled variable using an output variable of a regulation unit and a pump efficiency value, which is dependent on a pump type, wherein the pump efficiency value is derived based on an input value that is dependent on a rotation speed of the internal combustion engine, a pressure value in a high-pressure accumulator, the temporal derivation of the pressure value in the high-pressure accumulator and the volume flow temperature, regulating the pressure value in the high-pressure accumulator fed by a pump with said controlled variable;

wherein the regulating comprises providing the controlled variable to a volume flow regulation valve inline with the pump.

8. The method according to claim 7, wherein the input value is calculated as a sum of output variables of precontrol elements, into which the pressure value in the high-pressure accumulator and the rotation speed of the internal combustion engine or the volume flow temperature or the temporal derivation of the pressure value in the high-pressure accumulator are input respectively as input variables.

9. The method according to claim 7, wherein the output variables of the precontrol elements are a volume flow respectively.

10. The method according to claim 7, wherein switching leakage losses within the injection system that change over time are taken into account with the volume flow temperature as an input variable in the precontrol unit.

11. The method according to claim 7, wherein pump efficiency is determined from a stored table.

12. The method according to claim 7, wherein pump efficiency is determined by means of an approximation function.

13. A system for regulating an injection system of an internal combustion engine, wherein a pressure value in a high-pressure accumulator fed by a pump is regulated, comprising means for generating a controlled variable for regulating the pressure value in the high-pressure accumulator using an output variable of a regulation unit and a pump efficiency value, which is dependent on a pump type, wherein the pump efficiency value is derived based on an input value that is dependent on a rotation speed of the internal combustion engine, the pressure value in the high-pressure accumulator, the temporal derivation of the high-pressure accumulator value and the volume flow temperature wherein the controlled variable is provided to control a volume flow regulation valve inline with a high pressure pump.

14. The system according to claim 13, wherein the input value is calculated as a sum of output variables of precontrol elements, into which the pressure value in the high-pressure accumulator and the rotation speed of the internal combustion engine or the volume flow temperature or the temporal derivation of the pressure value in the high-pressure accumulator are input respectively as input variables.

15. The system according to claim 13, wherein the output variables of the precontrol elements are a volume flow respectively.

16. The system according to claim 13, wherein switching leakage losses within the injection system that change over time are taken into account with the volume flow temperature as an input variable in the precontrol unit.

17. The system according to claim 13, wherein pump efficiency is determined from a stored table.

18. The system according to claim 13, wherein pump efficiency is determined by means of an approximation function.

* * * * *